Patented May 16, 1939

2,158,407

UNITED STATES PATENT OFFICE 2,158,407

AZO DYESTUFFS AND THEIR MANUFACTURE

Achille Conzetti, Basel, Switzerland, assignor to the firm J. R. Geigy S. A., Basel, Switzerland No Drawing. Application March 12, 1938, Serial No. 195,659. In Switzerland March 19, 1937

9 Claims. (Cl. 260—193)

This invention relates to the production of azo dyestuffs by means of hydro-aromatic carbocyclic β-diketones, and has for its object to produce azo dyestuffs having good fastness properties.

Hydro-aromatic carbocyclic β-diketones with an enolisable keto group, as for example 5,6-dihydro-1,3-dihydroxybenzene and its derivatives have already been used for the production of azo dyestuffs.

In British Patent No. 461,965 it is proposed to combine 5,6-dihydro-1,3-dihydroxy-benzene or its derivatives with diazo compounds of amines containing nitro groups, which in the o-position to the amino group do not contain any carboxylic acid-, carboxylic acid ester-, hydroxy-, alkoxy-, or O-acyl-group, into new dyestuffs. These are suitable for dyeing cellulose derivatives and artificial masses, in so far as they do not contain any water solubilising groups, whilst the dyestuffs with sulphonic acid groups are suitable for dyeing wool, paper, silk or viscose artificial silk or for the production of calcium or barium lakes.

In United States Patent No. 2,088,911 there is described the production of dyestuffs, capable of being chromed, from 5,6-dihydro-1,3-dihydroxybenzene or its derivatives and diazo compounds of amines, which in the o-position to the amino group contain a carboxylic acid-, carboxylic acid ester-, hydroxy-, alkoxy- or O-acyl-group.

According to this invention diazo compounds, which are derived from amino-di- and -triphenyl ethers and which contain water solubilising groups but no nitro groups, are coupled with hydro-aromatic, carbocyclic-β-diketones. The diketones should contain an enolisable keto group. Outstanding pure yellow wool and silk dyestuffs are produced, which in addition to good fastness to washing and perspiration are also characterised by a very good fastness to light. They can also serve for the production of lakes by precipitation with alkaline earth salts.

Example 1

26.5 kg. of 2-amino diphenyl ether-4-sulphonic acid are diazotised as usual and the diazo compound is allowed to run at 0° C. into a solution of 14.5 kg. of dimethyl dihydro resorcin in 400 litres of water and 10 litres of soda lye 29.7% which has been made acid to litmus by the addition of a little dilute acetic acid and to which there have been added 20 kg. of crystallised sodium acetate. The coupling takes place very rapidly. After stirring for a number of hours there separates quantitively a greeny yellow dye. It is filtered and dried. Wool and silk are dyed in an acid bath very pure greeny yellow shades of very good fastness to light.

Instead of the above mentioned diazo compound there may be used isomer or homologue compounds or their substitution products, for example 4-amino diphenyl ether-2-sulphonic acid or analogous ethers, which can be substituted by methyl groups and/or halogens, as for example the compound of the formula

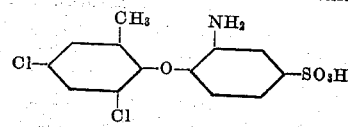

produced by the condensation of 2,4-dichloro-6-methyl-1-hydroxybenzene (sodium salt) with 3-nitro-4-chlorobenzene sulphonic acid and subsequent reduction. Instead of the nitrochlorobenzenesulphonic acid also nitrochlorotoluene sulphonic acids may be used.

Example 2

26.5 kg. 4-amino diphenyl ether-3-sulphonic acid are diazotised as usual and the diazo compound is introduced into a solution, acid to litmus, of 14.5 kg. of dimethyl dihydro resorcin, produced according to the indications in Example 1. After stirring for several hours the dyestuff has separated completely, it is filtered off and dried. It dyes wool and silk pure greeny yellow shades of very good fastness to light.

Instead of the above mentioned diazo component there may also be used substitution products, such as for example

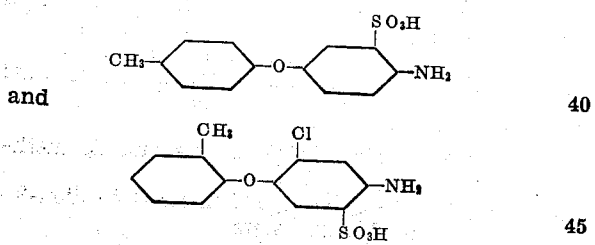

and The second compound can be produced by the condensation of 3,4-dichloro nitro benzene with o-cresolate, reduction and sulphonation by the baking process.

Example 3

35.7 kg. of 1-amino-2,4-diphenyl ether-5-sulphonic acid (produced by reduction of the condensation product of 1 mol. 2,4-dichloro-5- nitrobenzene-1-sulphonic acid with 2 mols. of phenolate) are diazotised as usual and the diazo compound is introduced into a solution of 14.5 kg. dimethyl dihydro resorcin dissolved and made acid to litmus as indicated in Example 1. The dyestuff, which separates completely, is filtered and dried. It dyes wool and silk pure yellow shades of very good fastness to light.

Instead of the above mentioned diazo compound there can be used derivatives thereof which are also substituted by methyl groups and halogen atoms, also compounds of the following type may be used

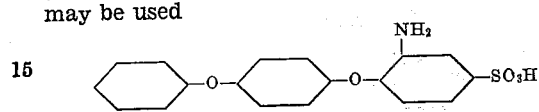

This triphenyl ether sulphonic acid is obtained by the condensation of 4-hydroxydiphenyl ether (alkali salt) with 3-nitro-4-chlorobenzene sulphonic acid and reduction.

*Example 4*

29.3 kg. of the amino diphenyl ether sulphonic acid of the formula

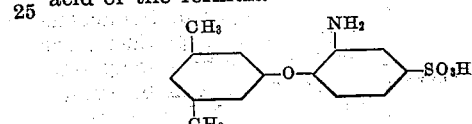

obtained from 3-nitro-4-chlorobenzene-1-sulphonic acid and m-xylenol (alkali salt) by condensation and subsequent reduction, are diazotised as usual and introduced into a fresh suspension precipitated with acetic acid of 18.5 kg. of cyclohexane spiro-cyclohexane-3,5-dion in 400 litres of water and 19 kg. of crystalline sodium acetate. After stirring for several hours the coupling is heated to 30° C., the separated dyestuff filtered off and dried. It dyes wool and silk yellow shades of very good fastness properties.

Instead of the above mentioned diazo compound there may be used the compounds mentioned in Examples 1 to 3. The dyestuffs obtained possess similar properties.

Instead of the coupling components of the above examples others containing the enolisable meta-diketohexane-ring may be used with similar results. There may be enumerated:

Dimethyldihydroresorcin carboxylic acid and its esters such as the methyl, ethyl, propyl, butyl ester, Phenyldihydroresorcin carboxylic acid and its alkyl esters, Para - dimethylaminophenyl - dihydroresorcin-carboxylic acid and its alkyl esters, Monomethyldihydroresorcindicarboxylic acid alkyl esters, 5-methyl- and 5-phenyl-dihydroresorcin, 5-phenyldihydroresorcindicarboxylic acid alkyl esters, Dihydrocresorcin, Cis-trans-meta-diketo-decaline and its methyl-homologues, Cyclohexane spiro - cyclohexane - 3,5 - dion-2 - carboxylic acid alkyl esters.

What I claim is:

1. A process for the manufacture of monoazo-dyestuffs consisting in coupling a diazotised aminobenzene sulphonic acid without nitro groups substituted in the benzene nucleus by at least one phenoxy group with 5:6-dihydro-1:3-dihydroxybenzenes.

2. A process for the manufacture of monoazo-dyestuffs consisting in coupling a diazotised aminodiphenylether sulphonic acid without nitro groups, the diazo group and the phenylether group being in one of the positions ortho and para to each other, with 5:6-dihydro-1:3-dihydroxybenzenes.

3. Monoazodyestuffs corresponding to the general formula

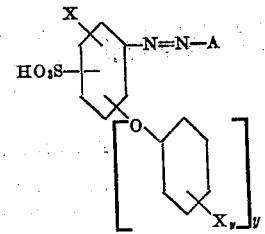

wherein the X's mean substituents selected from the group consisting of H, Cl and CH₃ and wherein the y's represent a number of 1 and 2 and A means the radical of a 5:6-dihydro-1:3-dihydroxybenzene.

4. Monoazodyestuffs corresponding to the general formula

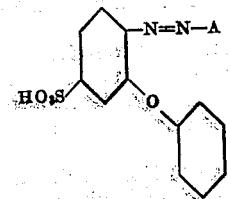

wherein A means the radical of a 5:6-dihydro-1:3-dihydroxybenzene.

5. Monoazodyestuffs corresponding to the general formula

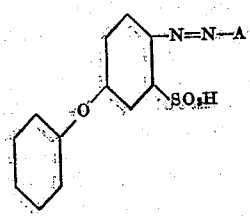

wherein A means the radical of a 5:6-dihydro-1:3-dihydroxybenzene.

6. Monoazodyestuffs corresponding to the general formula

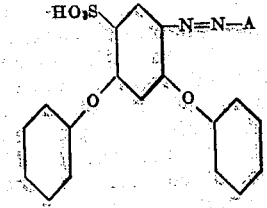

wherein A means the radical of a 5:6-dihydro-1:3-dihydroxybenzene.

7. The azo dyestuff of the formula

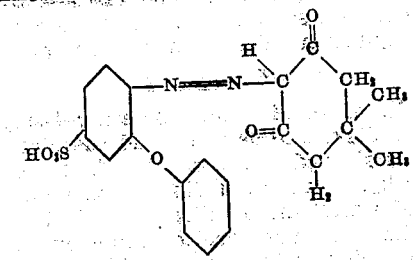

being a greeny yellow powder, soluble with the same color in water and dyeing wool and silk in an acid bath very pure greeny yellow shades of very good fastness to light.

8. The azo dyestuff of the formula

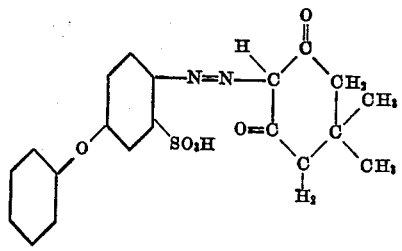

being a greeny yellow powder, soluble with the same color in water and dyeing wool and silk in an acid bath very pure greeny yellow shades of very good fastness to light.

9. The azo dyestuff of the formula

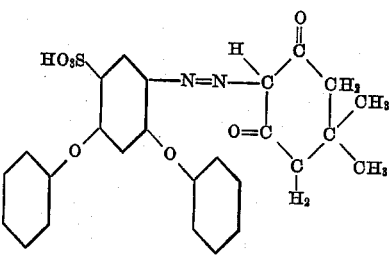

being a greeny yellow powder, soluble with the same color in water and dyeing wool and silk in an acid bath very pure greeny yellow shades of very good fastness to light.

ACHILLE CONZETTI.